United States Patent
Spurr et al.

(10) Patent No.: US 9,521,857 B2
(45) Date of Patent: Dec. 20, 2016

(54) DE-OILING APPARATUS AND METHOD IN MANUFACTURE OF LOW OIL POTATO CHIPS

(75) Inventors: Michael Alfred James Spurr, Leicester (GB); Brian Richard Newberry, Leicester (GB)

(73) Assignee: Frito-Lay Trading Company GmbH, Berne (CH)

( * ) Notice: Subject to any disclaimer, the term of this patent is extended or adjusted under 35 U.S.C. 154(b) by 55 days.

(21) Appl. No.: 13/982,468

(22) PCT Filed: Jan. 27, 2012

(86) PCT No.: PCT/EP2012/051346
§ 371 (c)(1),
(2), (4) Date: Oct. 9, 2013

(87) PCT Pub. No.: WO2012/104216
PCT Pub. Date: Aug. 9, 2012

(65) Prior Publication Data
US 2014/0030407 A1   Jan. 30, 2014

(30) Foreign Application Priority Data

Jan. 31, 2011   (GB) .................................. 1101607.8

(51) Int. Cl.
*A23B 4/00*    (2006.01)
*A23L 1/217*   (2006.01)

(52) U.S. Cl.
CPC ................. *A23L 1/217* (2013.01); *A23L 5/23* (2016.08); *A23L 19/10* (2016.08); *A23L 19/18* (2016.08); *A23L 33/00* (2016.08); *A23L 33/20* (2016.08)

(58) Field of Classification Search
CPC ........ A23L 1/0152; A23L 1/307; A23L 1/217; A23L 1/214; A23L 1/29
(Continued)

(56) References Cited

U.S. PATENT DOCUMENTS

| 2,091,372 A | 8/1937 | Moore |
| 2,110,184 A | 3/1938 | Webb |

(Continued)

FOREIGN PATENT DOCUMENTS

| CA | 911802 | 10/1972 |
| CA | 1151945 A | 8/1983 |

(Continued)

OTHER PUBLICATIONS

EP Search and Examination Report for GB Application No. 1101607.8 dated May 27, 2011, 5 pages.
(Continued)

*Primary Examiner* — Phuong Nguyen
(74) *Attorney, Agent, or Firm* — Colin P. Cahoon; Shaukat A. Karjeker; Carstens & Cahoon, LLP

(57) ABSTRACT

An apparatus for de-oiling potato slices, the apparatus comprising an elongate longitudinal conveyor having an upstream end and a downstream end, the conveyor being permeable to oil, water and air and being adapted to convey potato slices on the conveyor, a water spray station located towards the upstream end and a plurality of air-blower stations located in succession downstream of the water spray station, the water spray station comprising upper and lower water spray units adapted to spray water downwardly and upwardly, respectively, towards the conveyor, and each air-blower station comprising upper and lower air knife units adapted to direct an air blade downwardly and upwardly, respectively, towards the conveyor.

19 Claims, 1 Drawing Sheet

(58) Field of Classification Search
USPC ......... 99/355, 339, 357, 386, 443, 427, 473, 99/340, 536, 516; 426/455, 302, 438, 426/441, 523, 637
See application file for complete search history.

(56) References Cited

U.S. PATENT DOCUMENTS

| | | | |
|---|---|---|---|
| 3,355,299 A | 11/1967 | McLaughlin | |
| 3,365,301 A | 1/1968 | Lipoma et al. | |
| 3,436,229 A | 4/1969 | Simpson | |
| 3,627,535 A | 12/1971 | Davidson et al. | |
| 3,650,973 A | 3/1972 | Maeder et al. | |
| 3,674,504 A * | 7/1972 | Lane ............................ | 426/243 |
| 4,073,952 A | 2/1978 | Standing et al. | |
| 4,228,196 A | 10/1980 | Weaver et al. | |
| 4,277,510 A | 7/1981 | Wicklund et al. | |
| 4,283,425 A | 8/1981 | Yuan et al. | |
| 4,326,114 A | 4/1982 | Gerling et al. | |
| 4,471,195 A | 9/1984 | Ishii et al. | |
| 4,488,027 A | 12/1984 | Dudley et al. | |
| 4,537,786 A | 8/1985 | Bernard | |
| 4,608,262 A | 8/1986 | Galland | |
| 4,664,924 A | 5/1987 | Sugisawa et al. | |
| 4,707,370 A | 11/1987 | Kakis | |
| 4,714,813 A | 12/1987 | Trenchard | |
| 4,721,625 A | 1/1988 | Lee et al. | |
| 4,746,968 A | 5/1988 | Wear et al. | |
| 4,756,916 A | 7/1988 | Dreher et al. | |
| 4,800,090 A | 1/1989 | August | |
| 4,803,090 A | 2/1989 | Schlipalius et al. | |
| 4,873,093 A | 10/1989 | Fazzolare et al. | |
| 4,906,483 A | 3/1990 | Kloos | |
| 4,933,199 A | 6/1990 | Neel et al. | |
| 4,948,609 A | 8/1990 | Nafisi-Movaghar | |
| 4,950,492 A | 8/1990 | Shachat et al. | |
| 5,000,972 A | 3/1991 | Nafisi-Movaghar | |
| 5,049,711 A | 9/1991 | August | |
| 5,180,601 A | 1/1993 | Gaon et al. | |
| 5,182,127 A | 1/1993 | Schwab | |
| 5,188,859 A | 2/1993 | Lodge et al. | |
| 5,202,139 A | 4/1993 | Gaon et al. | |
| 5,204,133 A | 4/1993 | Hibbs et al. | |
| 5,292,540 A | 3/1994 | Laufer | |
| 5,298,707 A | 3/1994 | Sprecher et al. | |
| 5,392,698 A | 2/1995 | Sprecher et al. | |
| 5,393,543 A | 2/1995 | Laufer | |
| 5,425,308 A | 6/1995 | Dickerson et al. | |
| 5,445,849 A * | 8/1995 | Delvaux et al. ............ | 427/215 |
| 5,470,600 A | 11/1995 | Petelle et al. | |
| 5,500,240 A | 3/1996 | Addesso et al. | |
| 5,560,287 A * | 10/1996 | Petelle et al. .................. | 99/451 |
| 5,643,626 A | 7/1997 | Henson et al. | |
| 5,645,876 A | 7/1997 | Subramaniam et al. | |
| 5,676,989 A | 10/1997 | Durance et al. | |
| 5,690,982 A | 11/1997 | Fazzolare et al. | |
| 5,718,935 A | 2/1998 | Laufer | |
| 5,802,959 A * | 9/1998 | Benson et al. .................. | 99/355 |
| 5,858,431 A | 1/1999 | Wiedersatz | |
| 5,858,435 A * | 1/1999 | Gallo ............................ | 426/320 |
| 5,902,510 A | 5/1999 | Balbaa et al. | |
| 5,956,865 A | 9/1999 | Durance et al. | |
| 5,961,870 A | 10/1999 | Hogan | |
| 5,962,057 A | 10/1999 | Durance et al. | |
| 5,972,397 A | 10/1999 | Durance et al. | |
| 6,025,580 A | 2/2000 | Yagi | |
| 6,083,552 A | 7/2000 | Kershman | |
| 6,104,015 A | 8/2000 | Jayan et al. | |
| 6,172,346 B1 | 1/2001 | Wroe | |
| 6,251,465 B1 | 6/2001 | Bello et al. | |
| 6,350,973 B2 | 2/2002 | Wroe et al. | |
| 6,546,646 B1 | 4/2003 | Thomas | |
| 6,572,910 B2 | 6/2003 | Lanner et al. | |
| 6,884,449 B2 | 4/2005 | Lee et al. | |
| 7,029,716 B2 | 4/2006 | Margolis | |
| 7,238,381 B2 * | 7/2007 | Macaluso ..................... | 426/632 |
| 7,307,243 B2 | 12/2007 | Farkas et al. | |
| 7,393,550 B2 | 7/2008 | Barry et al. | |
| 7,993,693 B2 | 8/2011 | Bows et al. | |
| 2004/0250688 A1 | 12/2004 | Farkas et al. | |
| 2005/0086910 A1 | 4/2005 | Chambers et al. | |
| 2006/0040029 A1 * | 2/2006 | Gunawardena et al. ..... | 426/521 |
| 2006/0088633 A1 | 4/2006 | Barber et al. | |
| 2008/0026118 A1 | 1/2008 | Bows et al. | |
| 2008/0138480 A1 | 6/2008 | Bows et al. | |
| 2009/0258123 A1 | 10/2009 | Gallina | |
| 2009/0304878 A1 | 12/2009 | Loehn et al. | |
| 2010/0119659 A1 * | 5/2010 | Ovadia et al. .................. | 426/92 |
| 2010/0159087 A1 * | 6/2010 | Roth et al. ..................... | 426/240 |

FOREIGN PATENT DOCUMENTS

| | | | | |
|---|---|---|---|---|
| DE | 3233819 A1 | 3/1984 | | |
| EP | 0342059 | 11/1989 | | |
| GB | 2225205 | 5/1990 | | |
| GB | 2288718 | 11/1995 | | |
| RU | 2238652 C2 | 10/2004 | | |
| WO | 92/21250 A1 | 12/1992 | | |
| WO | 94/15481 A2 | 7/1994 | | |
| WO | 94/18851 A1 | 9/1994 | | |
| WO | 95/16361 A1 | 6/1995 | | |
| WO | 98/23161 A1 | 6/1998 | | |
| WO | 98/57554 A1 | 12/1998 | | |
| WO | 03/024242 A1 | 3/2003 | | |
| WO | 03/103407 | 12/2003 | | |
| WO | 2004/047542 A1 | 6/2004 | | |
| WO | 2008011489 A2 | 1/2008 | | |
| WO | WO2008151627 | * | 12/2008 | ............... B08B 3/02 |
| WO | 2009091674 | 7/2009 | | |
| WO | WO2009114346 | * | 12/2009 | ............ A47L 15/42 |
| WO | 2010019703 | 2/2010 | | |

OTHER PUBLICATIONS

EP Search and Examination Report for GB Application No. 1101627.6 dated May 25, 2011, 8 pages.
PCT International Search and Written Opinion for PCT/EP2012/051342 dated Nov. 16, 2012, 18 pages.

* cited by examiner

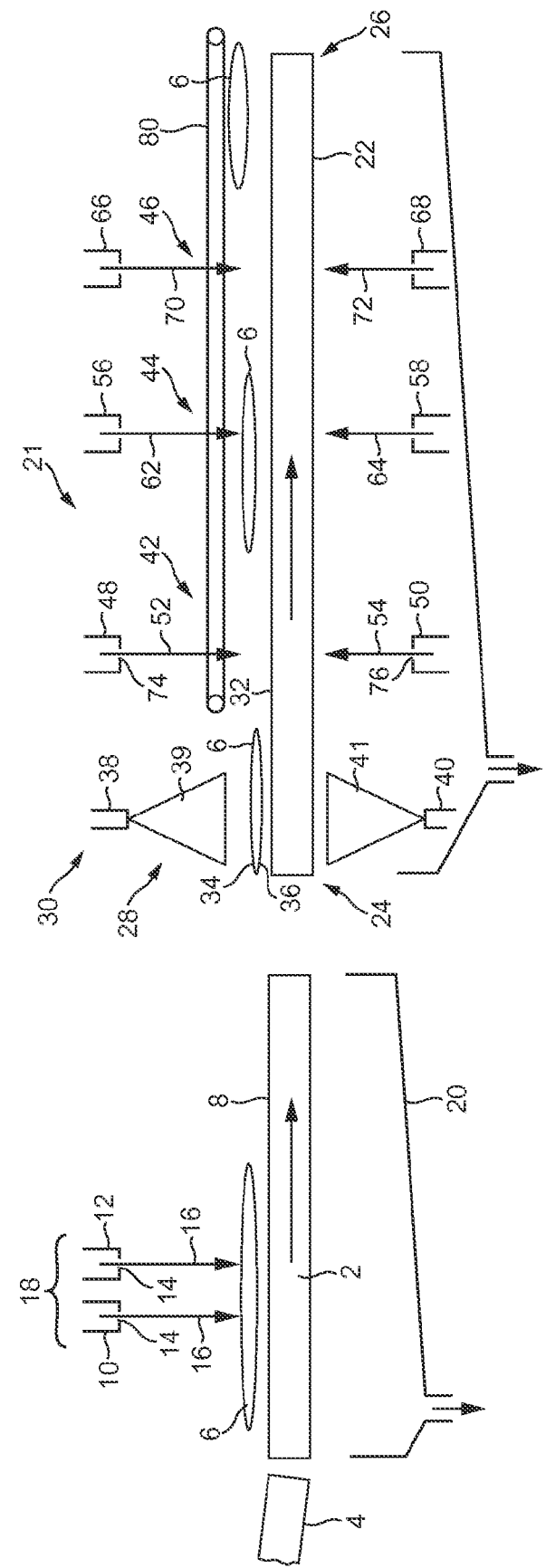

DE-OILING APPARATUS AND METHOD IN MANUFACTURE OF LOW OIL POTATO CHIPS

CROSS-REFERENCE TO RELATED APPLICATIONS

This application is a 371 National Stage Application claiming priority to PCT Application No. PCT/EP2012/051346 filed Jan. 27, 2012, which claims priority to Great Britain Application No. 1101607.8 filed Jan. 31, 2011, now GB Patent No. 2481469 issued Feb. 13, 2013, the technical disclosures of which are hereby incorporated by reference.

BACKGROUND OF THE INVENTION

Technical Field

This invention relates to an apparatus and method for de-oiling potato slices in the manufacture of low oil potato chips.

It has been known for many years to produce potato chips from slices of potato which are fried in oil, usually vegetable oil. Typical conventional potato chips have an oil content of about 30 to 35 wt % oil, based on the total weight of the potato chip. Potato chips exhibit specific organoleptic properties, in combination with visual appearance, to the consumer. The consumer desirous of purchasing a potato chip has a clear expectation of these product attributes in the product.

There is a general desire among snack food manufacturers, consumers and regulatory authorities for healthier food products. In the snack food industry, this has led to a desire for lower fat products. However, even though there may be a general consumer awareness of the benefits of eating lower fat versions of, or alternatives to, existing snack food products, the consumer generally requires the product to have desirable attributes such as texture and flavour. Even if a snack food product is produced which has high nutritional attributes, unless it also has the texture and flavour required by the consumer, the product would not successfully provide the consumer with an acceptable product to replace previous, less healthy snack food products. The challenge among snack food manufacturers is to produce nutritional or more healthy foods which provide the consumer with an improved taste and sensation experience, or at the very least do not compromise on taste and sensation as compared to the consumer's expectation for the particular product or class of products purchased.

There are in the market so-called lower oil snack food products, including potato chips and other products. Some of these processes are produced by modified frying processes using different frying temperatures than those conventionally employed, or cooking processes other than frying, such as baking. Some of these products produce snack foods with low oil, even as low as 5 wt %, but the snack food product is not regarded by the consumer to be an acceptable alternative to a potato chip, because the product cannot exhibit the organoleptic properties, in combination with the visual appearance, of a potato chip.

WO-A-2008/011489 and WO-A-2009/091674 in the name of Frito-Lay Trading Company GmbH disclose processes for making a healthy snack food. In those processes, a snack food is made so as to have an appearance and taste similar to conventional fried snack products, such as a potato chip. The potato slices are subjected to a sequence of steps which avoids frying of the slices in oil, and the result is a low fat potato chip.

In particular, these specifications disclose the use of microwave cooking of potato slices which have been pre-conditioned, for example by being treated in oil. Prior to the microwave cooking process, the potato slices are flexible, and have a typical thickness of 1 to 2.5 mm. The microwave cooking rapidly, or explosively, dehydrates the potato slices to achieve low moisture content in a drying step which simulates the conventional frying dehydration rate. The rapid microwave dehydration rigidifies the cooked potato slices, so that they have a crispness resembling that of typical fried potato chips. Additional final drying steps may be employed, for example using microwave drying.

It is disclosed that the oil preconditioning step comprises lipophilic preconditioning by placing the slices into a warm oil flume, a batch kettle or a continuous oil dip. During the lipophilic preconditioning step, a final slice temperature of about 60° C. to about 99.9° C. and a duration of about 30 to 600 seconds may be employed.

Subsequent to the lipophilic preconditioning step an oil removal step is employed. The oil removal step is disclosed as being performed using a variety of different wet methods, which may, for example, use at least one of the following: a steam blancher; a perforated rotating drum; washing in a hot or cold water bath; pressurised water jets; water knives; air knives; air atomised water nozzles; a mist of fine droplets of water; superheated steam or nitrogen; or centrifugal oil removal. It is disclosed that the most preferred embodiment uses a water spray comprising a mist of fine droplets of water.

Although a wide variety of such oil removal processes is disclosed in those prior specifications, there is still a need to provide a de-oiling process which provides a lower oil content potato slice that has a consumer acceptance on parity with conventional fried potato chips. It is necessary to accurately control the de-oiling process to achieve a desired oil content after the lipophilic preconditioning step so that the resultant flavour and organoleptic properties are achieved in the subsequent processing steps, which include microwave explosive dehydration.

Furthermore, there is still a need to provide an oil content during the processing which ensures that the final non-fried potato chip has a lower oil content as compared to conventional fried potato chips yet has a consumer acceptance, provided by the resultant flavour and organoleptic properties, on parity with conventional fried potato chips.

There is accordingly still a need for an apparatus and method for efficiently and reliably manufacturing, in a cost effective manner, a low fat potato chip which has not been fried but has organoleptic properties, in combination with the visual appearance, of a conventional fried potato chip.

SUMMARY OF THE INVENTION

The present invention accordingly provides an apparatus for de-oiling potato slices, the apparatus comprising an elongate longitudinal conveyor having an upstream end and a downstream end, the conveyor being permeable to oil, water and air and being adapted to convey potato slices on the conveyor, a water spray station located towards the upstream end and a plurality of air-blower stations located in succession downstream of the water spray station, the water spray station comprising upper and lower water spray units adapted to spray water downwardly and upwardly, respectively, towards the conveyor, and each air-blower station comprising upper and lower air knife units adapted to direct an air blade downwardly and upwardly, respectively, towards the conveyor.

The present invention further provides a method of de-oiling potato slices which have been coated in oil, the method comprising the steps of:

(a) providing a plurality of potato slices, each slice having been pretreated in oil;

(b) randomly feeding the potato slices onto an elongate longitudinal conveyor which is permeable to oil, water and air;

(c) spraying water downwardly and upwardly from respective upper and lower water spray units onto the plurality of potato slices on the conveyor to cause the water to displace and lift surface oil on the potato slices; and (d) thereafter directing upper and lower air blades downwardly and upwardly, respectively, onto the plurality of potato slices on the conveyor to cause the air blades to blow a mixture of oil and water from the potato slices, wherein the air blades comprise a plurality of pairs of upper and lower air blades spaced along the conveyor.

Preferred features are defined in the dependent claims.

The present inventors have found that the provision of such a sequence of specific de-oiler elements and steps, and the avoidance of steam treatment during de-oiling, can provide a resultant potato chip, produced by the lipophilic preconditioning and microwave explosive dehydration steps discussed above, which not only has low oil but also has the combination of flavour, organoleptic properties and shelf life in a non-fried potato chip which is equal or superior in consumer acceptance to conventional fried potato chips. In particular, the invention uses water and air to de-oil the potato slices, whereas the known use of steam de-oiling was found to cause oxidation of potato lipids which reduced the achievement of both the desired flavour and long shelf life.

BRIEF DESCRIPTION OF THE DRAWINGS

An embodiment of the present invention will now be described, by way of example only, with reference to the accompanying drawings in which:

FIG. 1 is a schematic side view of an apparatus for de-oiling potato slices, prior to microwave cooking, according to an embodiment of the present invention.

DETAILED DESCRIPTION OF THE INVENTION

An embodiment of an apparatus for de-oiling potato slices, prior to microwave cooking of the potato slices to form potato chips, according to one aspect of the present invention is illustrated in FIG. 1.

A primary endless belt conveyor 2 having a substantially horizontal orientation is provided. An inlet end of the conveyor 2 communicates with an exit of an oil flume 4 (illustrated schematically) comprising a lipophilic preconditioning unit for the potato slices 6. The conveyor 2 carries a succession of the potato slices 6 on its upper surface 8. The potato slices 6 have been randomly delivered onto the conveyor 2. The potato slices 6 are delivered onto the conveyor 2 in a slice distribution so as to have at least about 50% of the slices being single slices, i.e. not overlapping with an adjacent slice. In addition, at least 50% of the overlaps are no more than 50% of the area of each of the respective overlapping slices. Also, for each overlap no more than two slices 6 are stacked one upon the other on the conveyor 2. This substantially provides a monolayer of potato slices 6 across the length and width of the conveyor 2.

The potato slices 6 typically have a thickness of 1 to 2.5 mm, more typically about 1.3 mm (51 thousandths of an inch).

The potato slices 6 have been pre-treated in oil in the lipophilic preconditioning process and initially, prior to the de-oiling step, have about 30 to 45 wt % surface oil, typically about 40 wt % surface oil based on the dry weight of the final potato chip produced from the potato slice 6. In this specification the "dry weight of the final potato chip" assumes 2 wt % water content in the total weight of the final cooked and dried potato chip, prior to final seasoning of the potato chip. The oil typically comprises a vegetable oil such as sunflower oil, conventionally used for manufacturing potato chips. The oil is employed in the lipophilic preconditioning to provide the required organoleptic properties to the resultant potato chip, which has been cooked by the combination of the preliminary oil treating step and the subsequent microwave cooking step, and has not been fried, as for a conventional potato chip.

The conveyor 2 has a translational speed of from 0.1 to 0.5 m/second, typically about 0.2 m/second. As the potato slices 6 are carried on the upper surface of the primary conveyor 2, air is blown downwardly onto the potato slices 6 in a continuous manner at a primary air-blower station 18. The velocity of the air is typically from 30 to 60 meters per second, more typically from 40 to 50 meters per second, optionally from 45 to 50 meters per second. The primary air-blower station 18 comprises a set of a plurality of primary air knives 10, 12 which are mounted above the primary conveyor 2. In the embodiment, two longitudinally spaced air knives 10, 12 are provided. Each of the air knives 10, 12 typically has an air exit aperture 14 extending along the length of the air knife 10, 12, which extends transversely across the conveyor 2, for generating a downwardly-directed air blade 16 extending across the width of the conveyor 2. The air exit aperture 14 may have a width of from 0.5 to 1.5 mm, optionally 0.75 to 1.25 mm, further optionally about 1 mm. Each air knife 10, 12 is located so that a distance from the air exit aperture 14 to the upper surface 8 of the conveyor 2 carrying the potato slices 6 is from 20 to 40 mm, optionally 25 to 35 mm, further optionally about 30 mm.

The air knives 10, 12 generate downwardly directed parallel air blades 16, spaced in the direction of movement of the potato slices 6 along the conveyor 2, and act to blow excess surface oil on the potato slices 6 back into an oil supply for the lipophilic preconditioning apparatus. The air blades 16 most typically have an air velocity of 48 m/second.

For example, the excess oil removed by the air blades 16 is blown downwardly through the conveyor 2, and is captured by an oil capture device 20 located thereunder. The conveyor 2 is permeable to the oil and typically comprises an open mesh structure, for example comprised of a stainless steel balanced spiral wire mesh belt.

The air knives 10, 12 are parallel and longitudinally separated by a distance of, for example, a distance of from 100 to 300 mm, typically about 150 mm, so that each potato slice 6 is sequentially impacted by plural air blades 16 during the passage of the potato slice 6 through the primary air-blower station 18. Alternatively, the air knives 10, 12 may be separated by a distance which is less than a typical dimension of a potato chip, for example a distance of less than 50 mm, such as 30 to 40 mm, so that each potato slice 6 is simultaneously impacted by plural air blades 16 during at least a portion of the passage of the potato slice 6 through the primary air-blower station 18. Optionally, the air knives 10, 12 are inclined rearwardly so that the displaced oil is directed rearwardly into the oil capture device 20, which enhances oil capture.

After this preliminary step of blowing off excess surface oil with air blades, the conveyor 2 feeds the potato slices 6 to a de-oiler unit 21. The de-oiler unit 21 includes a second de-oiler belt conveyor 22 which, similar to conveyor 2, is an endless belt mounted substantially horizontally and has a belt speed of from 0.1 to 0.5 m/second, typically about 0.2 m/second. The conveyor 22 is also permeable to oil and water, and comprises a similar open mesh structure as conveyor 2, for example a stainless steel balanced spiral wire mesh belt. The de-oiler conveyor 22 conveys the potato slices 6 from an upstream end 24 to a downstream end 26 through a succession of de-oiling stations.

A first de-oiling station 28, located relatively upstream along the conveyor 22, comprises a water spray station 30 which sprays water onto the potato slices 6 which are carried on the upper surface 32 of the conveyor 22. The water is sprayed both downwardly from an upper water spray device 38, forming an upper spray 39, and upwardly from a lower water spray device 40, forming a lower spray 41. Typically, in each water-spray device 38, 40 a plurality of water pressure nozzles is provided across the width of the conveyor 22. Typically, the water exits of the water spray devices 38, 40 are located a distance of from 50 to 150 mm, optionally 75 to 125 mm, further optionally about 100 mm, from the conveyor upper surface 32 carrying the potato slices 6.

At the water spray station 30, water is sprayed onto both upper and lower major surfaces 34, 36 of each of the potato slices 6. The water spray impacts on the upper and lower surfaces 34, 36 of the potato slices 6 and acts to displace and lift surface oil from the surfaces of the slice 6.

A typical water feed rate from each of the upper and lower water devices 38, 40 is from 3 to 5 kilograms of water per minute, optionally from 4 to 4.5 liters of water per minute, most typically 4.2 liters/minute, for a typical potato slice throughput of 250 kilograms per hour, i.e. from 0.72 to 1.2 liters of water per hour per kg of potato slices per hour, optionally from 0.96 to 1.08 liters of water per hour per kg of potato slices per hour.

After this initial surface oil lifting step using water, a succession of pairs of oppositely directed secondary air knives, and directed towards each other, is employed to remove the lifted oil, mixed together with the residual water, from the surfaces 34. 36 of the potato slices 6. In the embodiment, three successive sets 42, 44, 46 of upper and lower air knives are employed, which sets 42, 44, 46 are located in a mutually spaced configuration extending along a portion of the length of the conveyor 22 downstream of the water spray station 30.

Accordingly, there are plural parallel sets 42, 44, 46 of upper and lower secondary air knives mounted above and below the conveyor 22 which are adapted to provide high velocity air, as a narrow blade-like flow extending across the width of the conveyor 22, with the high velocity air blade blowing the water and oil mixture from the surfaces 34, 36 of the potato slices 6. The velocity of the air is typically from 30 to 60 meters per second. The water and oil mixture which has been blown off the slices falls downwardly into a base 60 of the de-oiler unit for removal and reuse or recycling. The air blades produced from the sets 42, 44, 46 of upper and lower air knives are parallel.

A first air knife set 42 comprises upper and lower air knives 48, 50 each of which is arranged to blow an air blade 52, 54 at a high velocity onto the upper or lower surface 34, 36, respectively, of the potato slices 6 on the conveyor 6. For these air knives 48, 50 the air velocity may be from 30 to 40 meters per second, optionally from 32 to 37 meters per second. Typically, the upper air knife 48 has an air blade velocity of 34 m/second and the lower air knife 50 has an air blade velocity of 35 m/second.

A second air knife set 44 comprises upper and lower air knives 56, 58 each of which is arranged to blow an air blade 62, 64 at a high velocity onto the upper or lower surface 34, 36, respectively, of the potato slices 6. For these air knives 56, 58 the air velocity may be from 40 to 50 meters per second, optionally from 45 to 50 meters per second. Typically, the upper air knife 56 has an air blade velocity of 47 m/second and the lower air knife 58 has an air blade velocity of 47 m/second.

A third air knife set 46 comprises upper and lower air knives 66, 68 each of which is arranged to blow an air blade 70, 72 at a high velocity onto the upper or lower surface 34, 36, respectively, of the potato slices 6. For these air knives 66, 68 the air velocity may be from 40 to 50 meters per second, optionally from 45 to 50 meters per second. Typically, the upper air knife 66 has an air blade velocity of 46 m/second and the lower air knife 68 has a velocity of 47 m/second.

The use of a plurality of sequential successive pairs of oppositely directed air knives mounted both above and below the conveyor 22 in the de-oiler unit provides a greater degree of control in achieving a desired weight % of oil in the de-oiled potato slices 6 leaving the de-oiler unit 21.

For each of the air knife sets 42, 44, 46, a typical distance from the respective upper or lower air knife exit aperture 74, 76 to the upper surface 32 of the conveyor 22 carrying the potato slices 6 is from 20 to 40 mm, optionally 25 to 35 mm, further optionally about 30 mm. Each of the air knives 48, 50, 56, 58, 66, 68 has an exit aperture 74, 76 extending along the length of the air knife 48, 50, 56, 58, 66, 68, which exit aperture 74, 76 extends transversely across the conveyor 22, for generating an air blade 52, 54, 62, 64, 70, 72 extending across the width of the conveyor 22. The air exit apertures 74, 76 may have a width of from 0.5 to 1.5 mm, optionally 0.75 to 1.25 mm, further optionally about 1 mm.

Since the air knife sets 42, 44, 46 blow air upwardly as well as downwardly, in order to avoid the potato slices 6 being blown off the conveyor 22 a longitudinally oriented hold-down belt 80 is located above the conveyor 22 in the vicinity of the air knife sets 42, 44, 46. The potato slices 6 are conveyed between the lower conveyor 22 and the upper hold-down belt 80 and are held in position as they are conveyed successively past the air knife sets 42, 44, 46. The hold-down belt 80 is typically undriven, but it may alternatively be driven so as to assist the conveyor 22.

In the illustrated embodiment, there are three sets of air knives 42, 44, 46 downstream of the water spray station 30. In other embodiments a larger number of air knife pairs is provided, which can provide enhanced uniformity of oil content of the de-oiled potato slices. In contrast, since the air knives 10, 12 blow air only downwardly, a hold-down belt is not required. The potato slices 6 are agitated by the downwardly blown air from the air knives 10, 12, which agitation assists removal of free surface oil, but the slices remain on the conveyor 2.

The final oil percent amount in the de-oiled potato slices 6 is achieved by balancing the amount of water and the amount of air supplied. It is possible to use more air and less water and vice versa to fine tune the de-oiling operation and the final oil content. The target final oil content for the potato slices using the de-oiler is 12.5 wt % oil +/−2 wt % based on the dry weight, having 2 wt % water content, of the final cooked and dried potato chip after microwave explosive dehydration and final drying.

In modifications to the illustrated embodiment, a single conveyor may be used instead of the combination of a primary conveyor and a de-oiler conveyor, and/or the number of air knives and/or water spray stations may be varied.

The invention claimed is:

1. An apparatus for de-oiling potato slices, the apparatus comprising:
   an elongate conveyor having an upstream end and a downstream end, the conveyor being permeable to oil, water and air and being adapted to convey potato slices on the conveyor, the upstream end of the elongate conveyor receiving potato slices pre-treated in oil from an exit end of a lipophilic preconditioning unit for potato slices;
   a water spray station located towards the upstream end, the water spray station comprising upper and lower water spray units adapted to spray water downwardly and upwardly, respectively, towards potato slices pre-treated in oil on the conveyor to displace and lift surface oil from the potato slices pre-treated in oil;
   a plurality of air-blower stations located in succession downstream of the water spray station, each air-blower station comprising upper and lower air knife units adapted to direct an air blade downwardly and upwardly, respectively, towards potato slices pre-treated in oil on the conveyor to remove oil and water from the potato slices pre-treated in oil;
   a longitudinally extending hold-down belt co-extensive with and vertically separated from the elongate conveyor such that when potato slices pre-treated in oil are being de-oiled, the potato slices pre-treated in oil are held in position, between the elongate conveyor below and the longitudinally extending hold down belt above, as they are conveyed past the plurality of air blower stations; and
   an oil capture trap located below the elongate conveyor to receive oil removed from potato slices during the de-oiling process.

2. The apparatus according to claim 1, wherein the upper and lower water spray units extend across the width of the conveyor.

3. The apparatus according to claim 1, wherein the upper and lower water spray units are spaced a distance of from 50 to 150 mm, from the conveyor.

4. The apparatus according to claim 1, wherein the upper and lower water spray units are adapted each to spray from 0.72 to 1.2 liters of water per hour per kg of potato slices per hour, towards the conveyor.

5. The apparatus according to claim 1, wherein at least three air-blower stations are located in succession downstream of the water spray station and generate parallel air blades.

6. The apparatus according to claim 5, wherein the upper and lower air knife units located at each of the at least three air-blower stations are adapted to generate an air blade from a respective air exit aperture extending across the width of the conveyor.

7. The apparatus according to claim 6, wherein the air exit aperture has a width of from 0.5 to 1.5 mm.

8. The apparatus according to claim 6, wherein the air exit aperture is a distance from the conveyor of from 20 to 40 mm.

9. The apparatus according to claim 6, wherein the air blade has an air velocity of from 30 to 60 meters per second.

10. The apparatus according to claim 9, wherein the upper and lower air blades of a first air-blower station located downstream of the water spray station have an air velocity of from 30 to 40 meters per second.

11. The apparatus according to claim 10, wherein the upper and lower air blades of a second air-blower station located downstream of the first air-blower station have an air velocity of from 40 to 50 meters per second.

12. The apparatus according to claim 11, wherein the upper and lower air blades of a third air-blower station located downstream of the second air-blower station have an air velocity of from 40 to 50 meters per second.

13. The apparatus according to claim 1, further comprising a primary air-blower station located upstream of the water spray station.

14. The apparatus according to claim 13, wherein the primary air-blower station comprises at least one upper air knife unit adapted to direct an air blade downwardly towards a primary conveyor.

15. The apparatus according to claim 14, wherein the primary air-blower station comprises two primary upper air knife units which are longitudinally separated by a distance of from 100 to 300 mm.

16. The apparatus according to claim 15, wherein the primary upper air knife units located at the primary air-blower station are adapted to generate a respective primary air blade from a respective primary air exit aperture extending across the width of the primary conveyor.

17. The apparatus according to claim 16, wherein the primary air exit aperture has a width of from 0.5 to 1.5 mm.

18. The apparatus according to claim 16, wherein the primary air exit aperture is a distance from the primary conveyor of from 20 to 40 mm.

19. The apparatus according to claim 16, wherein the primary air blade has an air velocity of from 40 to 50 meters per second.

* * * * *